UNITED STATES PATENT OFFICE 2,516,891

FROZEN FOODS

Robert L. Lloyd, Port Washington, N. Y., assignor to American Maize-Products Company, a corporation of Maine No Drawing. Application April 23, 1948, Serial No. 22,950

5 Claims. (Cl. 99—193)

This invention relates to a frozen food and the method of making it. It relates particularly to the application of starch conversion syrup solids of low reducing sugars content over the surfaces of the particles of food to be frozen.

The invention is especially useful in connection with the making of frozen fruits and will be first illustrated, therefore, by description in connection with such use.

In the making of frozen fruits involving the use of sucrose or dextrose sweetening agents, there are known difficulties. The application of such a sweetening agent to apples, for instance, causes juice to separate from the apples up to and including the time of use. As a result it is not uncommon, in making pies from such fruit, to draw off the juice, bake the pie with the remaining solid portion of the fruit, and then reintroduce the juice through a hole in the top crust of the pie before the pie is served. Other fruits are known to bleed badly when put up in the usual quick freeze manner. There are also oxidation and change of color.

The present invention provides a method and composition for minimizing loss of juice from fruit, protecting color of naturally highly colored fruit, and decreasing oxidation of the fruit.

Briefly stated, my invention comprises the method of and the product resulting from application, over the particles of fruit or other cellular, juicy food to be frozen, of a layer of starch conversion syrup solids of total reducing sugars content calculated as dextrose not above 45% of the weight of the syrup solids and preferably within the range 24% to 45%.

The syrup solids which are used in my composition and method absorb a large proportion of water before being liquefied by the water. This promotes relative dryness in the packaged frozen food. Furthermore, when the syrup solids do dissolve in any juice which exudes from the fruit, the syrup solids of the dextrose equivalent stated give a very viscous solution which retards diffusion and therefore retards escape of the juice from the fruit into the liquid phase.

The food to be frozen may be either raw or processed, as by being cooked. It may be any one of the common varieties of fruits, as, for example, raspberries, cherries, peeled apples, peeled peaches or blueberries. It may be also other food product such as green peas or beans but there is no point to using my method or composition with any food in which escape of juice from the food, change of color, or oxidation is unobjectionable as the quick freezing has been practiced heretofore.

The starch conversion syrup solids are those made by conventional processes from usual starches such as corn, tapioca, potato, or waxy maize now known by the term amioca. This starch is converted (hydrolyzed) by usual technique and methods, as by heating the starch dispersed in water with a small proportion of hydrochloric acid and discontinuing the heating when test of specimens removed from the hydrolysis equipment shows that, the reducing sugars content of the conversion mixture has reached that desired, namely, some percentage within the range 24% to 45% of total reducing sugars calculated as dextrose on the weight of starch hydrolysis solids in the conversion mixture. The product so made is then refined and the starch conversion syrup solids reduced to finely divided solid form in usual manner, as by spray drying the refined starch conversion syrup in a stream of warm air. The syrup may also be those made by enzyme conversion of starch and refining in usual manner.

A sweetening agent such as sucrose may be added along with the syrup solids when the sucrose taste is desired in the finished product. If sucrose is used, it is introduced to advantage in the proportions of 25 to 200 parts for 100 parts of the syrup solids.

The effect of proportion of syrup solids in the total weight of such solids and sucrose is illustrated by the following experimental data.

In each of several beakers, 100 g. of red raspberries were mixed carefully but thoroughly with 25 g. of the mixed syrup solids, the proportion of the syrup solids to the total weight of such solids and sucrose used, if any, being 33%, 50%, and 100%, respectively. The mixtures were then transferred to glass funnels so that juice and any seeds released by rupture of the cells of the fruit would escape through the stems of the funnels. Under the stems were placed 100 cc. graduated cylinders. The amount of the drippings collected from each sample in a sixty minute interval was then read.

The results are shown in the following table.

| Material Added to Raspberries | Drainage from 100 g. Raspberries cc. |
|---|---|
| Syrup solids exclusively | 46 |
| ½ syrup solids—1.2 sucrose | 55 |
| ⅓ syrup solids—⅔ sucrose | 62 |

Accompanying the much larger drainage of juice and seeds, with the increasing proportion of sucrose in the syrup solids and sucrose mixture, there was also a correspondingly greater shrinkage of the raspberries left in the funnel. In fact, the shrinkage in the volume of the berries with increasing proportion of sucrose was even more conspicuous than the increase in the volume of drainings from the berries.

The syrup solids are ordinarily used in the proportion of 15 to 35 parts for 100 of the fruit. Proportions here and elsewhere herein are expressed as parts by weight unless otherwise specifically stated.

The invention will be further illustrated by description in connection with the following specific examples of the practice of it.

Example 1

Pitted and washed sour cherries are delivered to five gallon cans until only approximately enough space is left above the cherries to receive the syrup solids which are to be added. The syrup solids of dextrose equivalent 30 are placed over the top of the layer of cherries in the can, in the proportion required for the particular quality of frozen cherries desired. For this purpose I add 35 parts of the syrup solids to 100 parts of the pitted cherries.

The syrup solids as used are dry, that is commercially dry, so that they appear as solid material, not as a solution, and are preferably in finely divided form. In this particular example I have used spray dried free flowing powder.

Example 2

The procedure of Example 1 is followed except that the fruit used is washed red raspberries and the proportion of syrup solids is made 20 parts.

Example 3

The procedure of Example 1 is followed with the exception that the fruit used are washed cultivated blueberries. They are covered with 15 parts of starch conversion syrup solids in dry form and of dextrose equivalent 45 for 100 of the blueberries. The whole is then subjected to quick freezing and stored in the usual cold condition until thawed just previous to use.

Example 4

The procedure of any one of Examples 1 to 3 is followed except that sucrose is also added in the proportion of 1 to 3 parts for 1 part of the syrup solids. The sucrose is preferably premixed with the syrup solids. When sucrose is used the proportion of syrup solids is reduced, the total of such solids and sucrose being kept within the range 15 to 35 parts for 100 parts of the fruit.

It will be observed that the foods are maintained at normal pressure at all times during the processing; no mechanical compression is applied.

In any of the examples, green beans or shelled peas or lima beans may be substituted for the fruit, on a pound for pound basis.

Products made as described undergo a minimum of rupture of cells in the food, as shown by decreased shrinkage of the food and also decreased exudation of juices. The products retain the natural clear color, particularly in the case of frozen fruit, thus showing decreased oxidation. In addition the products possess the nutrient value of the added syrup solids.

It will be understood that it is intended to cover all changes and modifications of the examples of the invention herein chosen for the purpose of illustration which do not constitute departures from the spirit and scope of the invention.

What I claim is:

1. In making a frozen food the method which comprises applying over the surface of a cellular juicy food a layer of starch conversion syrup solids in dry finely divided form and of total reducing sugars content, calculated as dextrose, 24% to 45% of the total weight of the syrup solids, and then subjecting the resulting mixture to freezing, the food being maintained at normal pressure during the processing described.

2. The method described in claim 1, the food to be frozen being fruit and the proportion of the syrup solids being 15 to 35 parts by weight for 100 parts of the said fruit.

3. A frozen food comprising a cellular juicy food for human consumption in the form of particles and starch conversion syrup solids disposed in contact with the surfaces of the said particles, the syrup solids having a reducing sugars content calculated as dextrose of 24% to 45% of the total weight of the syrup solids.

4. A frozen food comprising a fruit and starch conversion syrup solids disposed over the surface of the fruit, the syrup solids having a total reducing sugars content calculated as dextrose of 24% to 45% of the weight of the syrup solids.

5. In making frozen fruit, the method which comprises introducing the fruit into a container, applying over the upper surface of the fruit in the container a layer of starch conversion syrup solids in finely divided form and of total reducing sugars content, calculated as dextrose, 24% to 45% of the total weight of the syrup solids, and then subjecting the fruit to freezing, the fruit being maintained at all times during the processing at normal pressure.

ROBERT L. LLOYD.

REFERENCES CITED

The following references are of record in the file of this patent:

UNITED STATES PATENTS

| Number | Name | Date |
|---|---|---|
| 1,564,599 | Magaw et al. | Dec. 8, 1925 |
| 1,729,893 | Oliver | Oct. 1, 1929 |
| 1,940,337 | Triplett et al. | Dec. 19, 1933 |
| 2,137,205 | Cowgill | Nov. 15, 1938 |